US012764656B2

(12) United States Patent
Chang et al.

(10) Patent No.: US 12,764,656 B2
(45) Date of Patent: Oct. 13, 2026

(54) LOW-POWER LISTEN IN WIRELESS COMMUNICATIONS

(71) Applicant: MediaTek Inc., Hsinchu City (TW)

(72) Inventors: Cheng-Yi Chang, Hsinchu City (TW); Yi-Chun Chou, Hsinchu City (TW); Ching-Wen Hsiao, Hsinchu City (TW); Chien-Wei Chen, Hsinchu (TW)

(73) Assignee: MediaTek Inc., Hsinchu City (TW)

( * ) Notice: Subject to any disclaimer, the term of this patent is extended or adjusted under 35 U.S.C. 154(b) by 131 days.

(21) Appl. No.: 17/961,036

(22) Filed: Oct. 6, 2022

(65) Prior Publication Data

US 2023/0117078 A1 Apr. 20, 2023

Related U.S. Application Data

(60) Provisional application No. 63/255,983, filed on Oct. 15, 2021.

(51) Int. Cl.
*H04W 52/02* (2009.01)
*H04W 52/42* (2009.01)

(52) U.S. Cl.
CPC ....... *H04W 52/0206* (2013.01); *H04W 52/42* (2013.01)

(58) Field of Classification Search
CPC ............. H04W 52/0206; H04W 52/42; H04W 52/346; Y02D 30/70
USPC .......................................................... 370/318
See application file for complete search history.

(56) References Cited

U.S. PATENT DOCUMENTS

| | | | | |
|---|---|---|---|---|
| 9,800,227 | B1 * | 10/2017 | Sovero ............... | H03H 11/1217 |
| 2010/0208640 | A1 | 8/2010 | Cheng et al. | |
| 2014/0050133 | A1 | 2/2014 | Jafarian et al. | |

(Continued)

FOREIGN PATENT DOCUMENTS

| | | | |
|---|---|---|---|
| TW | 202131741 A | 8/2021 | |
| WO | WO 2021004052 A1 | 1/2021 | |

OTHER PUBLICATIONS

European Patent Office, Communication in European Patent Application No. 22201155.3-1206, Sep. 20, 2024.

(Continued)

*Primary Examiner* — Jae Y Lee
*Assistant Examiner* — Haeshil Jessica Choi
(74) *Attorney, Agent, or Firm* — Andy M. Han; Han IP PLLC

(57) ABSTRACT

Techniques pertaining to low-power enhanced multi-link single radio (EMLSR) listen in wireless communications are described. A first multi-link device (MLD) reduces power consumption while supporting a latency-sensitive application by performing certain operations. The first MLD first listens at a lower power in a narrower bandwidth to receive an initial physical-layer protocol data unit (PPDU) from a second MLD as part of a frame exchange. In response to receiving the initial PPDU, the first MLD switches from the narrower bandwidth to a wider bandwidth to complete the frame exchange with the second MLD in the wider bandwidth. In reducing the power consumption, the first MLD reduces its power consumption to the lower power when operating in the narrower bandwidth compared to a higher power used by the first MLD when operating in the wider bandwidth.

20 Claims, 6 Drawing Sheets

(56) References Cited

U.S. PATENT DOCUMENTS

| | | | | |
|---|---|---|---|---|
| 2015/0282068 | A1* | 10/2015 | Rajagopal | H04L 27/2692 370/350 |
| 2018/0206192 | A1 | 7/2018 | Vermani et al. | |
| 2020/0014523 | A1* | 1/2020 | Huang | H04L 5/001 |
| 2021/0007168 | A1* | 1/2021 | Asterjadhi | H04W 52/0235 |
| 2021/0250963 | A1 | 8/2021 | Seok et al. | |
| 2021/0289442 | A1 | 9/2021 | Naribole et al. | |
| 2021/0297184 | A1 | 9/2021 | Huang et al. | |
| 2021/0377856 | A1* | 12/2021 | Chu | H04W 52/0216 |
| 2022/0104261 | A1* | 3/2022 | Kwon | H04W 48/16 |
| 2023/0104554 | A1* | 4/2023 | Fang | H04W 76/15 370/318 |
| 2023/0109759 | A1* | 4/2023 | Ratnam | H04W 56/0015 370/329 |
| 2023/0345366 | A1* | 10/2023 | Shafin | H04W 52/0216 |
| 2023/0354187 | A1* | 11/2023 | Kim | H04W 76/15 |
| 2023/0379999 | A1* | 11/2023 | Kim | H04W 76/20 |

OTHER PUBLICATIONS

European Patent Office, Extended European Search Report in European Patent Application No. 22201155.3, Mar. 13, 2023.

Polonelli Tommaso et al.: "Ultra-Low Power Wake-Up Receiver for Location Aware Objects Operating with UWB", 2021 17th International Conference on Wireless and Mobile Computing, Networking and Communications (WIMOS), IEEE, Oct. 11, 2021, pp. 369-376, XP034027290.

* cited by examiner

LOW-POWER LISTEN IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/255,983, filed 15 Oct. 2021, the content of which herein being incorporated by reference in its entirety.

TECHNICAL FIELD

The present disclosure is generally related to wireless communications and, more particularly, to low-power enhanced multi-link single radio (EMLSR) listen in wireless communications.

BACKGROUND

Unless otherwise indicated herein, approaches described in this section are not prior art to the claims listed below and are not admitted as prior art by inclusion in this section.

With the prevalence of battery-operated devices such as mobile phones, low-power consumption is a key performance index for such devices. In Wi-Fi 7 in accordance with the Institute of Electrical and Electronics Engineers (IEEE) standards, a multi-link device (MLD) operating in the multi-link operation (MLO) tends to consume more power due to usage of multiple communication links in MLO. On the other hand, in low-traffic scenarios, a device typically enters a power-save mode to conserve power. However, this may result in higher latency which would not be acceptable for certain latency-sensitive applications such as gaming and virtual reality (VR). Accordingly, one issue that needs to be addressed pertains to conservation of listen power for low-latency applications. Therefore, there is a need for a solution of low-power EMLSR listen in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to low-power EMLSR listen in wireless communications. Under various proposed schemes in accordance with the present disclosure, power used in listening to a channel by a device may be conserved for low-latency applications. Moreover, the proposed schemes may also be applicable for other scenarios including spatial-multiplexing power-save (SMPS) and self-defined systems (e.g., low-power MLD/STA/TDLS/P2P listen). Thus, it is believed that various schemes proposed herein may address or otherwise alleviate aforementioned issue(s).

In one aspect, a method may involve a first MLD reducing power consumption while supporting a latency-sensitive application by performing certain operations. For instance, the method may involve the first MLD listening at a lower power in a narrower bandwidth to receive an initial physical-layer protocol data unit (PPDU) from a second MLD as part of a frame exchange. The method may also involve the first MLD, in response to receiving the initial PPDU, switching from the narrower bandwidth to a wider bandwidth to complete the frame exchange with the second MLD in the wider bandwidth. In reducing the power consumption, the method may involve the first MLD reducing its power consumption to the lower power when operating in the narrower bandwidth compared to a higher power used by the first MLD when operating in the wider bandwidth.

In another aspect, an apparatus implementable in a first MLD may include a transceiver configured to communicate wirelessly and a processor coupled to the transceiver. The processor may reduce power consumption while supporting a latency-sensitive application by performing certain operations. For instance, the processor may listen, via the transceiver, at a lower power in a narrower bandwidth to receive an initial PPDU from a second MLD as part of a frame exchange. In response to receiving the initial PPDU, the processor may switch the transceiver from the narrower bandwidth to a wider bandwidth to complete the frame exchange with the second MLD in the wider bandwidth. In reducing the power consumption, the processor may reduce the power consumption by the first MLD to the lower power when operating in the narrower bandwidth compared to a higher power used by the first MLD when operating in the wider bandwidth.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to low-power EMLSR listen in wireless communications. According to the present disclosure, a number of possible solutions may be implemented separately or jointly. That is, although these possible solutions may be described below separately, two or more of these possible solutions may be implemented in one combination or another.

Figure 1:
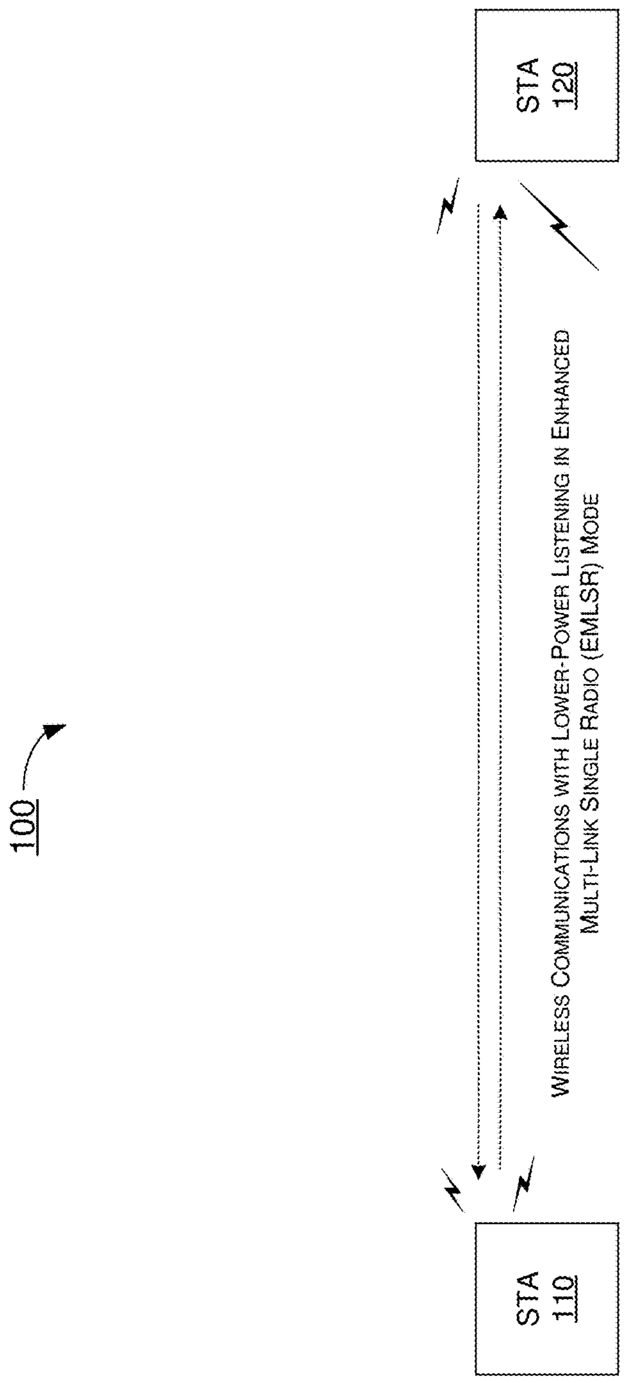
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 6 illustrate examples of implementation of various proposed schemes in network environment 100 in accordance with the present disclosure. The following description of various proposed schemes is provided with reference to FIG. 1~FIG. 6.

Referring to FIG. 1, network environment 100 may involve at least a first communication entity or station (STA) 110 communicating wirelessly with a second communication entity or STA 120. Each of STA 110 and STA 120 may be an access point (AP) STA or a non-AP STA, respectively. Each of STA 110 and STA 120 may be affiliated with an MLD capable of operating with EMLSR enabled. In some cases, STA 110 and STA 120 may be associated with a basic service set (BSS) in accordance with one or more IEEE 802.11 standards (e.g., IEEE 802.11be and future-developed standards) such as Wi-Fi 7. Each of STA 110 and STA 120 may be configured to communicate with each other by utilizing the various proposed schemes described herein pertaining to low-power EMLSR listen in wireless communications. It is noteworthy that, while the various proposed schemes may be individually or separately described below, in actual implementations each of the proposed schemes may be utilized individually or separately. Alternatively, some or all of the proposed schemes may be utilized jointly.

Figure 2:
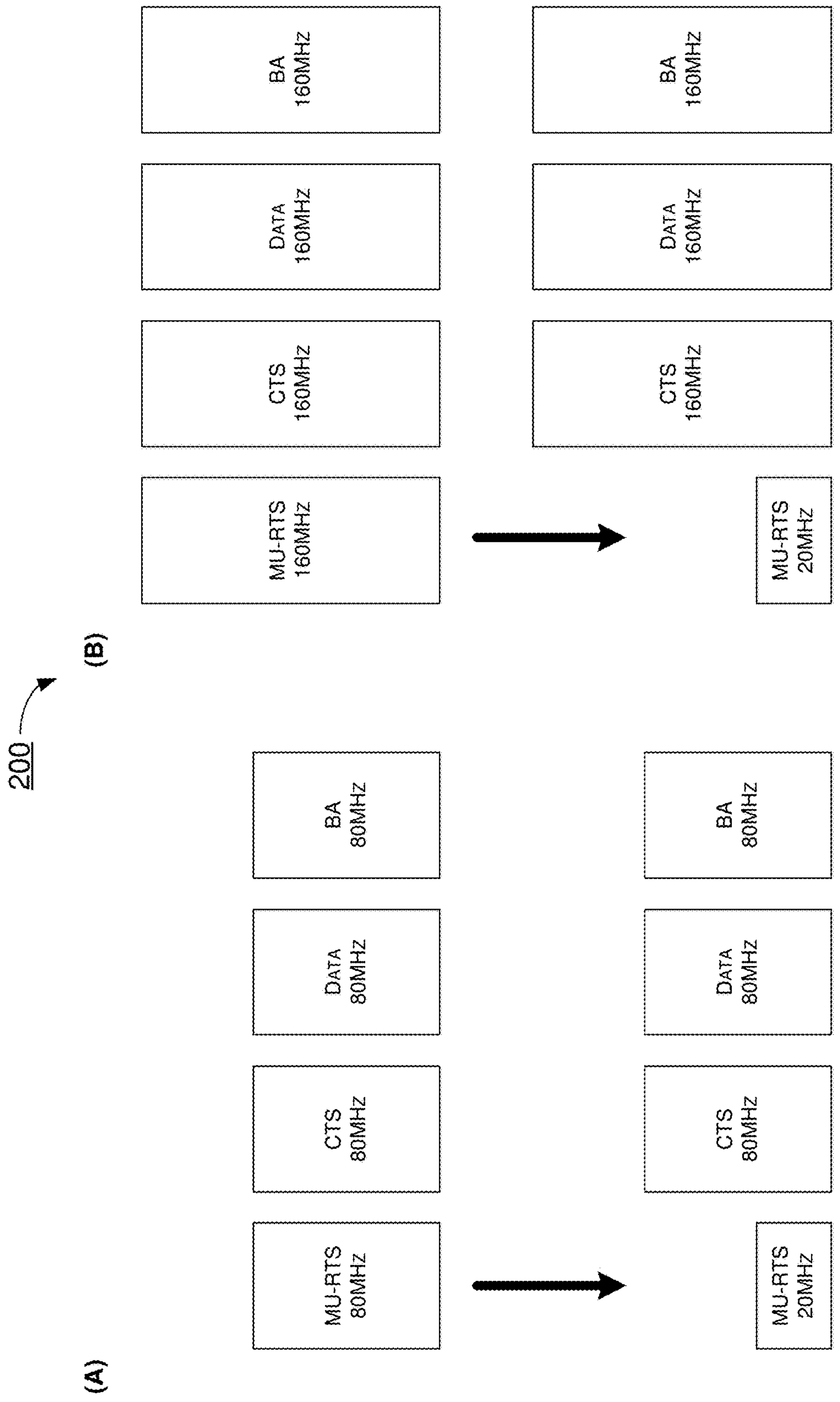
FIG. 2 is a diagram of an example scenario under a proposed scheme in accordance with the present disclosure.

Under a proposed scheme in accordance with the present disclosure, an MLD, such as an EMLSR MLD (e.g., STA 110 and/or STA 120), may reduce its power consumption by listening in one or multiple channels or links with reduced power in a 20 MHz frequency segment or subblock (e.g., a primary 20 MHz frequency segment plus one or more non-primary 20 MHz frequency segments) and dynamically switching to a wider data bandwidth (e.g., 40 MHz, 80 MHz, 160 MHz or 320 MHz comprising the primary 20 MHz frequency segment or subblock and one or more non-primary 20 MHz frequency segments or subblocks) afterwards. It is noteworthy that the term "reduced power" herein refers to a lower power that is used by the MLD when operating in the 20 MHz frequency band compared to a higher power used by the MLD when operating in other frequency bands (e.g., 40 MHz, 80 MHz, 160 MHz or 320 MHz). FIG. 2 illustrates an example scenario 200 in comparison of a conventional and the proposed scheme. Referring to FIG. 2, a conventional scheme of a STA affiliated with an EMLSR MLD is shown in the upper half of part (A), wherein a STA listens in a wider bandwidth (e.g., 40 MHz, 80 MHz, 160 MHz or 320 MHz) with a single power level that is not varied among different operating modes. In the lower half of par (A), an example scenario of the proposed scheme is shown. Instead of listening in a wider data bandwidth (e.g., 40 MHz, 80 MHz, 160 MHz or 320 MHz), a STA (e.g., STA 110 and/or STA 120) may first listen in the primary 20 MHz frequency segment or subblock. Upon receiving a multi-user request-to-send (MU-RTS) from another device or STA, the MLD may dynamically switch to the wider bandwidth (e.g., 40 MHz, 80 MHz, 160 MHz or 320 MHz) to respond with a clear-to-send (CTS) as well as to receive data and acknowledge with a block acknowledgement (BA). Part (A) of FIG. 2 shows an example of low-power listening in a 20 MHz frequency segment or subblock and then switching to an 80 MHz bandwidth for subsequent frame exchange. Part (B) of FIG. 2 shows an example of low-power listening in a 20 MHz frequency segment or subblock and then switching to a 160 MHz bandwidth for subsequent frame exchange. Advantageously, a certain amount of power conservation may be gained in performing the listening (e.g., 15% gain as listening power may be reduced from 240 mW to 208 mW in experiments). It is noteworthy that the receive (Rx) power used may depend on the received data bandwidth (DBW).

Under a proposed scheme in accordance with the present disclosure with respect to non-EMLSR links (or MLDs that do not support ELMSR or a STA), a handshake process (e.g., a medium access control (MAC) protocol) may first take place so that an MLD or a STA (e.g., STA 110 and/or STA 120) may inform other communication entities (e.g., an AP MLD/STA) that it is capable of low-power listening in a bandwidth power-save (BWPS) mode. Correspondingly, instead of receiving an initial PPDU in a wider DBW (e.g., 40 MHz, 80 MHz, 160 MHz or 320 MHz), the transmitting device (e.g., an AP STA or another non-AP STA) may receive the initial PPDU with a non-high-throughput (non-HT) duplicate format with MU-RTS, RTS or buffer status report poll (BSRP) in a Physical Layer Convergence Procedure (PLCP) service data unit (PSDU) in a narrower bandwidth (e.g., a primary 20 MHz frequency segment or subblock) where the MLD performs the low-power listening in the BWPS mode. Based on information contained in the MU-RTS or PPDU, the MLD may dynamically switch its transceiver operating bandwidth to the wider DBW for subsequent frame exchange.

Under a proposed scheme in accordance with the present disclosure with respect to low-power listening and dynamic switching to a wider DBW, there may be several approaches to hardware implementation. In a first approach, the low-power listening may be performed at a central frequency (e.g., 20 MHz band) within the maximum DBW and hence there is no need for synthesizer (SX) central frequency switching. For instance, baseband signal processing and filtering may be utilized to switch between the 20 MHz band (in which the low-power listening is performed) and negotiated bandwidth capabilities (e.g., an 40 MHz, 80 MHz, 160 MHz or 320 MHz bandwidth). In a second approach, fast bandwidth synthesizer (BSX) switching (e.g., from the 20 MHz band to the DBW) may be utilized. The operating bandwidth may be switched to the received data bandwidth. Accordingly, Rx power may be conserved when the received data bandwidth is smaller than the negotiated bandwidth capabilities. Alternatively, the operating bandwidth may be switched to the negotiated bandwidth capabilities. In this approach, the SX setting time may be critical. In a third approach, an extra offset synthesizer may be utilized. The offset synthesizer may be utilized to offset the original central frequency (on which the low-power listening is performed).

Figure 3:
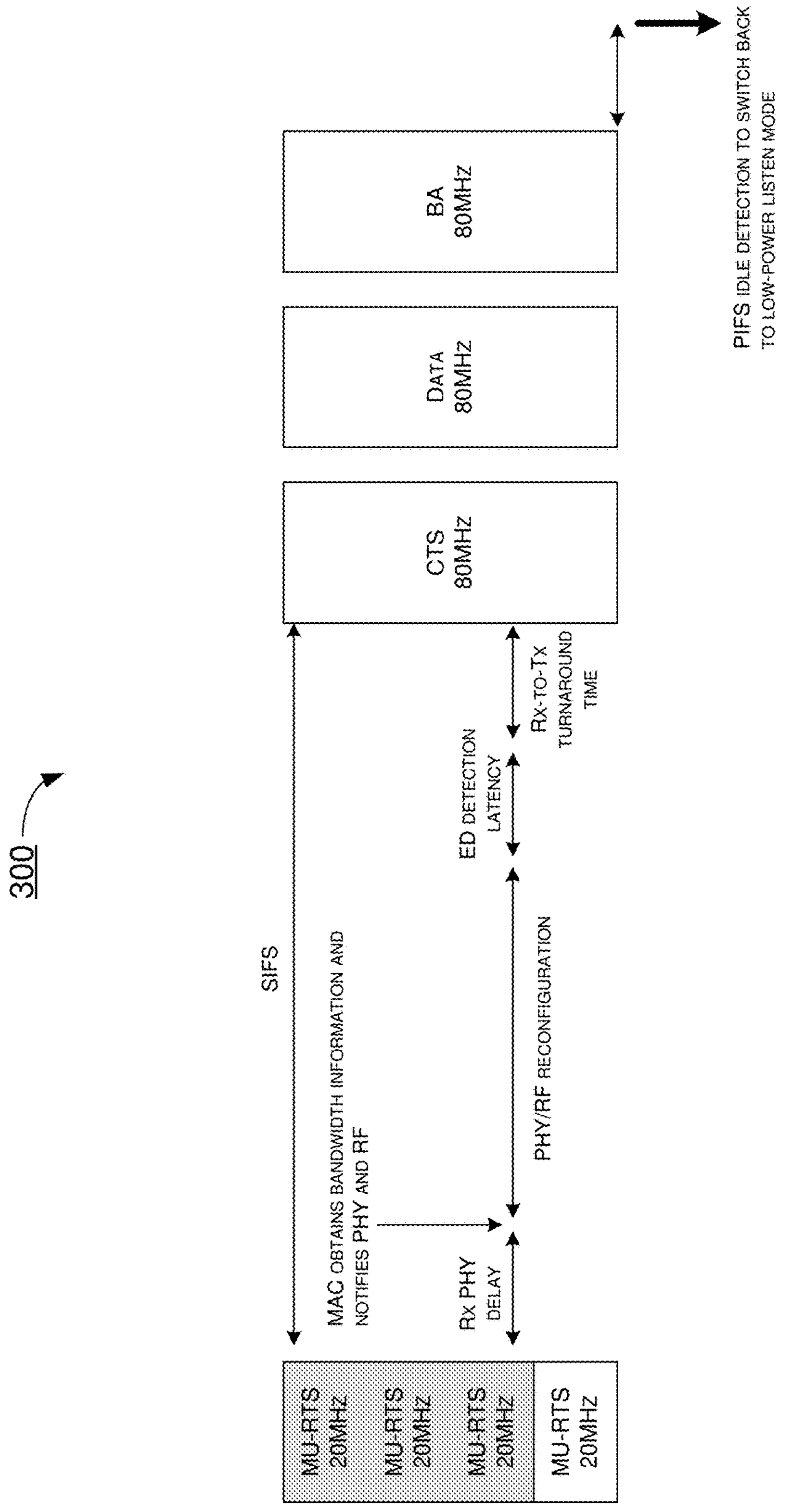
FIG. 3 is a diagram of an example scenario under a proposed scheme in accordance with the present disclosure.

Under a proposed scheme in accordance with the present disclosure, bandwidth switching may occur after an initial PPDU is received correctly without error. FIG. 3 illustrates an example scenario 300 under the proposed scheme. Referring to FIG. 3, a first STA affiliated with a first MLD (e.g., STA 110 or STA 120) may listen in a narrower bandwidth (e.g., 20 MHz) to receive an initial PPDU (e.g., an MU-RTS) from a second STA affiliated with a second MLD (e.g., STA 120 or STA 110). The first STA affiliated with the first MLD may obtain bandwidth information about data bandwidth (e.g., 40 MHz, 80 MHz or 160 MHz or 320 MHz) in a service field in the initial PPDU. For instance, after a reception delay at the physical (PHY) layer of the first MLD, the medium access control (MAC) layer of the first MLD may obtain bandwidth information and notify the PHY layer and the RF transceiver. After the initial PPDU is received correctly without error, the first MLD may switch its radio frequency (RF) transceiver from operating in the narrower bandwidth to the data bandwidth which is wider (e.g., 40 MHz, 80 MHz or 160 MHz or 320 MHz) as determined based on the information in the service field of the initial PPDU. In scenario 300, a processor of the first MLD may notify a synthesizer to switch from the narrower bandwidth (e.g., 20 MHz) to the data bandwidth (e.g., 80 MHz). This may also involve switching a central frequency corresponding to the narrower bandwidth to that of the wider data bandwidth. Correspondingly, reconfiguration at the PHY layer and the RF transceiver may take place. After switching to the wider data bandwidth, the first MLD may perform energy detection (ED) as well as RF switching (to change from receiving to transmitting), both of which involving certain latency. Then, after a reception-to-transmission (Rx-to-Tx) turnaround delay, the first MLD may exchange frames, such as CTS, data and BA, with the second MLD in the wider data bandwidth. The duration between the end of reception of the initial PPDU and the beginning of the frame exchange (e.g., transmission of the CTS) may be a short inter-frame space (SIFS). After the frame exchange, the synthesizer of the first MLD may switch the operating bandwidth of the transceiver from the wider data bandwidth back to the narrower bandwidth, so as to minimize power consumption. For instance, after a period of point coordination function (PCF) inter-frame space (PIFS) idle detection, the first STA may switch back to a low-power listen mode to listen in the narrower bandwidth.

Figure 4:
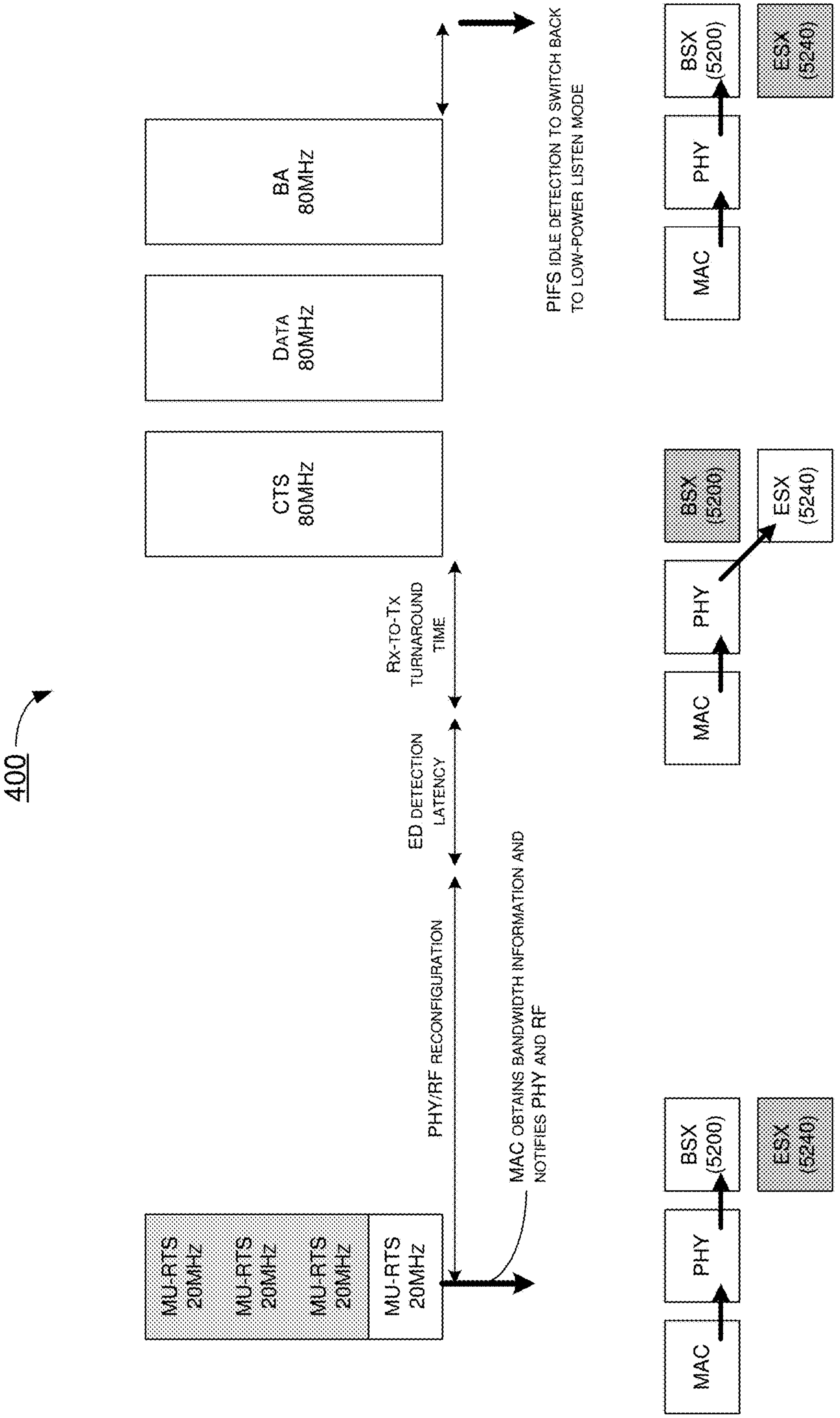
FIG. 4 is a diagram of an example scenario under a proposed scheme in accordance with the present disclosure.

Under a proposed scheme in accordance with the present disclosure, bandwidth switching may occur after the bandwidth of an initial PPDU is identified. FIG. 4 illustrates an example scenario 400 under the proposed scheme. Referring to FIG. 4, a first STA affiliated with a first MLD (e.g., STA 110 or STA 120) may listen in a narrower bandwidth (e.g., 20 MHz) to receive an initial PPDU (e.g., an MU-RTS) from a second STA affiliated with a second MLD (e.g., STA 120 or STA 110). The first STA affiliated with the first MLD may obtain bandwidth information about data bandwidth (e.g., 40 MHz, 80 MHz or 160 MHz or 320 MHz) in a service field in the initial PPDU. For instance, after a reception delay at the PHY layer of the first MLD, the MAC layer of the first MLD may obtain bandwidth information and notify the PHY layer and the RF transceiver. After the bandwidth of the initial PPDU is identified, the first MLD may switch its RF transceiver from operating in the narrower bandwidth to the data bandwidth which is wider (e.g., 40 MHz or 80 MHz or 160 MHz or 320 MHz) as determined based on the information in the service field of the initial PPDU. In scenario 400, a processor of the first STA affiliated with an MLD may notify a base synthesizer to switch from the narrower bandwidth (e.g., 20 MHz) to the data bandwidth (e.g., 80 MHz). The processor may also turn on and utilize an extra offset synthesizer to offset an original central frequency associated with the narrower bandwidth. Correspondingly, reconfiguration at the PHY layer and the RF transceiver may take place. After switching to the wider data bandwidth, the first STA affiliated with the first MLD may perform physical layer ED as well as RF switching (to change from receiving to transmitting), both of which involving certain latency. Then, after a Rx-to-Tx turnaround delay, the first MLD may exchange frames, such as CTS, data and BA, with the second MLD in the wider data bandwidth. After the frame exchange, the base synthesizer of the first MLD may switch the operating bandwidth of the transceiver from the wider data bandwidth back to the narrower bandwidth, so as to minimize power consumption. For instance, after a period of PIFS idle detection, the first STA may switch back to a low-power listen mode to listen in the narrower bandwidth. The processor may also turn off the base or extra offset synthesizer.

Under a proposed scheme in accordance with the present disclosure with respect to ELMSR low-power listening, when a non-AP MLD is operating in the EMLSR mode with an AP MLD supporting the EMLSR mode, the non-AP MLD may listen on one or more EMLSR links, by having its affiliated STA(s) corresponding to those link(s) in awake state. The listening operation may include clear channel assessment (CCA) and receiving an initial control frame of frame exchanges that is initiated by the AP MLD. An AP affiliated with the AP MLD that initiates frame exchanges with the non-AP MLD on one of the EMLSR links may begin the frame exchanges by transmitting the initial control frame to the non-AP MLD with the initial control frame transmitted in a non-HT PPDU or non-HT duplicate PPDU format using a rate of 6 Mbps, 12 Mbps or 24 Mbps.

It is noteworthy that the various proposed schemes described above may be applicable not only in EMLSR scenarios but also in other scenarios such as, for example and without limitation, enhanced multi-link multiple radios (EMLMR), non-EMLSR, multi-link multiple radios (MLMR), multi-link single radio (MLSR), SMPS, BWPS, peer-to-peer (P2P) as well as tunneled direct link setup (TDLS).

Illustrative Implementations

Figure 5:
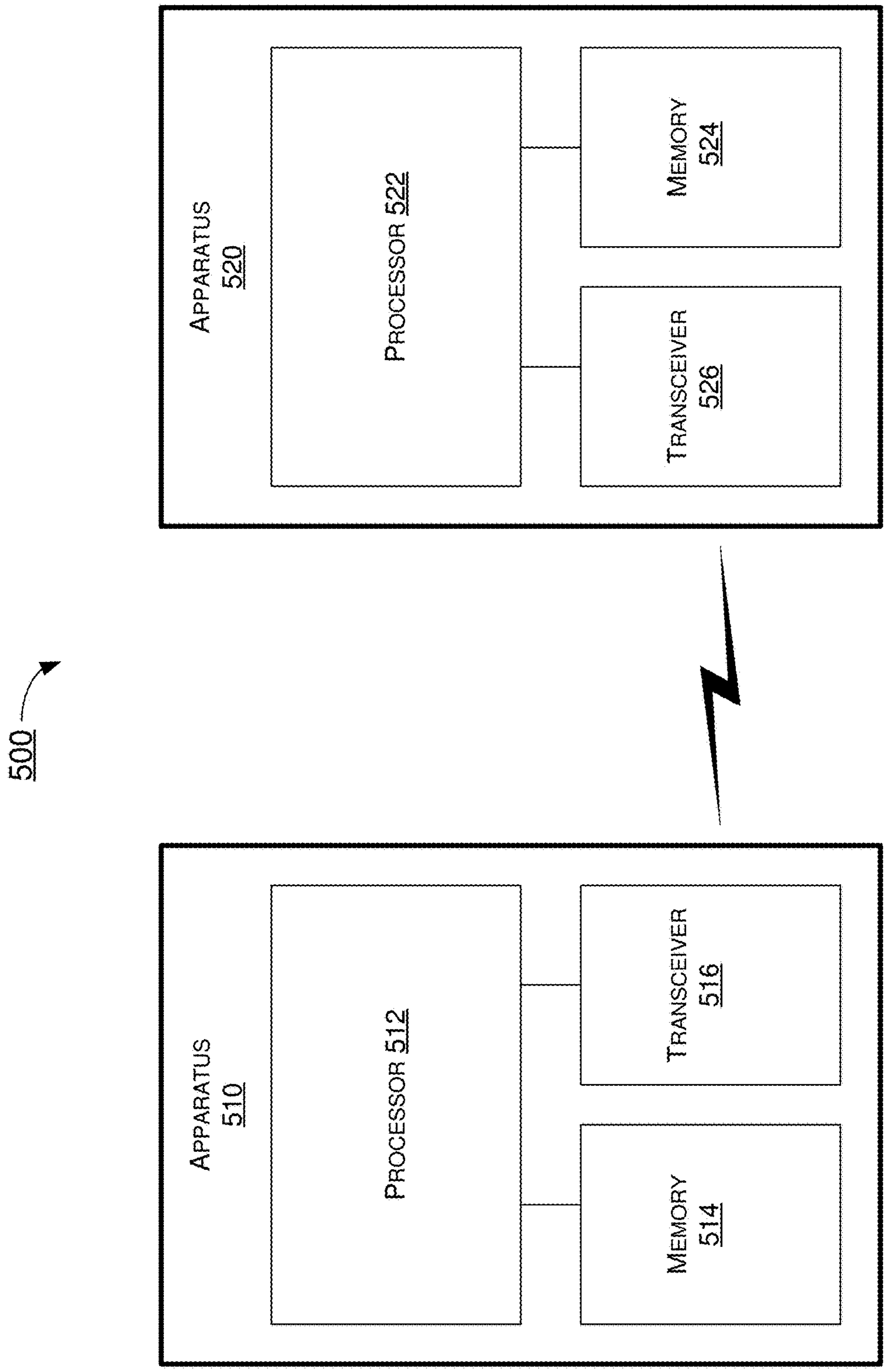
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to low-power EMLSR listen in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP STA or an AP STA, such as a portable or mobile apparatus, a wearable apparatus, a wireless communication apparatus or a computing apparatus. When implemented in a STA, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a STA or an AP. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, each of processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, each of processor 512 and processor 522 may include multiple processors in some implementations and a single processor in other implementations in accordance with the present disclosure. In another aspect, each of processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 512 and processor 522 is a special-purpose machine specifically designed, arranged and configured to perform specific tasks including those pertaining to low-power EMLSR listen in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data. It is noteworthy that, although transceiver 516 and transceiver 526 are illustrated as being external to and separate from processor 512 and processor 522, respectively, in some implementations, transceiver 516 may be an integral part of processor 512 as a system on chip (SoC) and/or transceiver 526 may be an integral part of processor 522 as a SoC.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (FeRAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as STA 110, and apparatus 520, as STA 120, is provided below. It is noteworthy that, although a detailed description of capabilities, functionalities and/or technical features of apparatus 520 is provided below, the same may be applied to apparatus 510 although a detailed description thereof is not provided solely in the interest of brevity. It is also noteworthy that, although the example implementations described below are provided in the context of WLAN, the same may be implemented in other types of networks.

Under various proposed schemes pertaining to low-power EMLSR listen in wireless communications in accordance with the present disclosure, with apparatus 510 implemented in or as STA 110 functioning as a first MLD and apparatus 520 implemented in or as STA 120 functioning as a second MLD in network environment 100, processor 512 of apparatus 510 may reduce power consumption while supporting a latency-sensitive application (e.g., gaming or VR) by performing certain operations. For instance, processor 512 may listen, via transceiver 516, at a lower power in a narrower bandwidth to receive an initial PPDU from apparatus 520 as part of a frame exchange. Additionally, processor 512 may switch transceiver 516 from the narrower bandwidth to a wider bandwidth to complete the frame exchange with apparatus 520 in the wider bandwidth in response to receiving the initial PPDU. Moreover, processor 512 may switch transceiver 516 back to the narrower bandwidth after the frame exchange.

In some implementations, the narrower bandwidth may include a 20 MHz, 40 MHz, 80 MHz, or 160 MHz bandwidth, and the wider bandwidth may include a 40 MHz, 80 MHz, 160 MHz or 320 MHz bandwidth. In some implementations, in reducing the power consumption, processor 512 may reduce the power consumption by the MLD to the lower power when operating in the narrower bandwidth compared to a higher power used by the MLD when operating in the wider bandwidth.

In some implementations, in switching from the narrower bandwidth to the wider bandwidth, processor 512 may switch from a listening bandwidth to a received data bandwidth without switching a synthesizer central frequency.

In some implementations, in switching from the narrower bandwidth to the wider bandwidth, processor 512 may perform a synthesizer central frequency switching.

In some implementations, in switching from the narrower bandwidth to the wider bandwidth, processor 512 may perform the switching with an offset synthesizer that offsets an original central frequency used in the listening.

In some implementations, in switching, processor 512 may switch an operating bandwidth of transceiver 516 from the narrower bandwidth to the wider bandwidth responsive to having correctly received the initial PPDU. Alternatively, in switching, processor 512 may switch the operating bandwidth of transceiver 516 from the narrower bandwidth to the wider bandwidth after a bandwidth of the initial PPDU is identified.

In some implementations, in listening, processor 512 may listen in an EMLSR mode, an EMLMR mode, an MLSR mode, an MLMR mode, a non-EMLSR mode, a SMPS mode, a BWPS mode, a P2P mode, or a TDLS mode.

In some implementations, in listening, processor 512 may inform apparatus 520 that apparatus 510 is capable of low-power listening in a BWPS mode. In such cases, the initial PPDU may be received with a non-HT duplicate format with MU-RTS, RTS or BSRP in a PSDU.

Illustrative Processes

Figure 6:
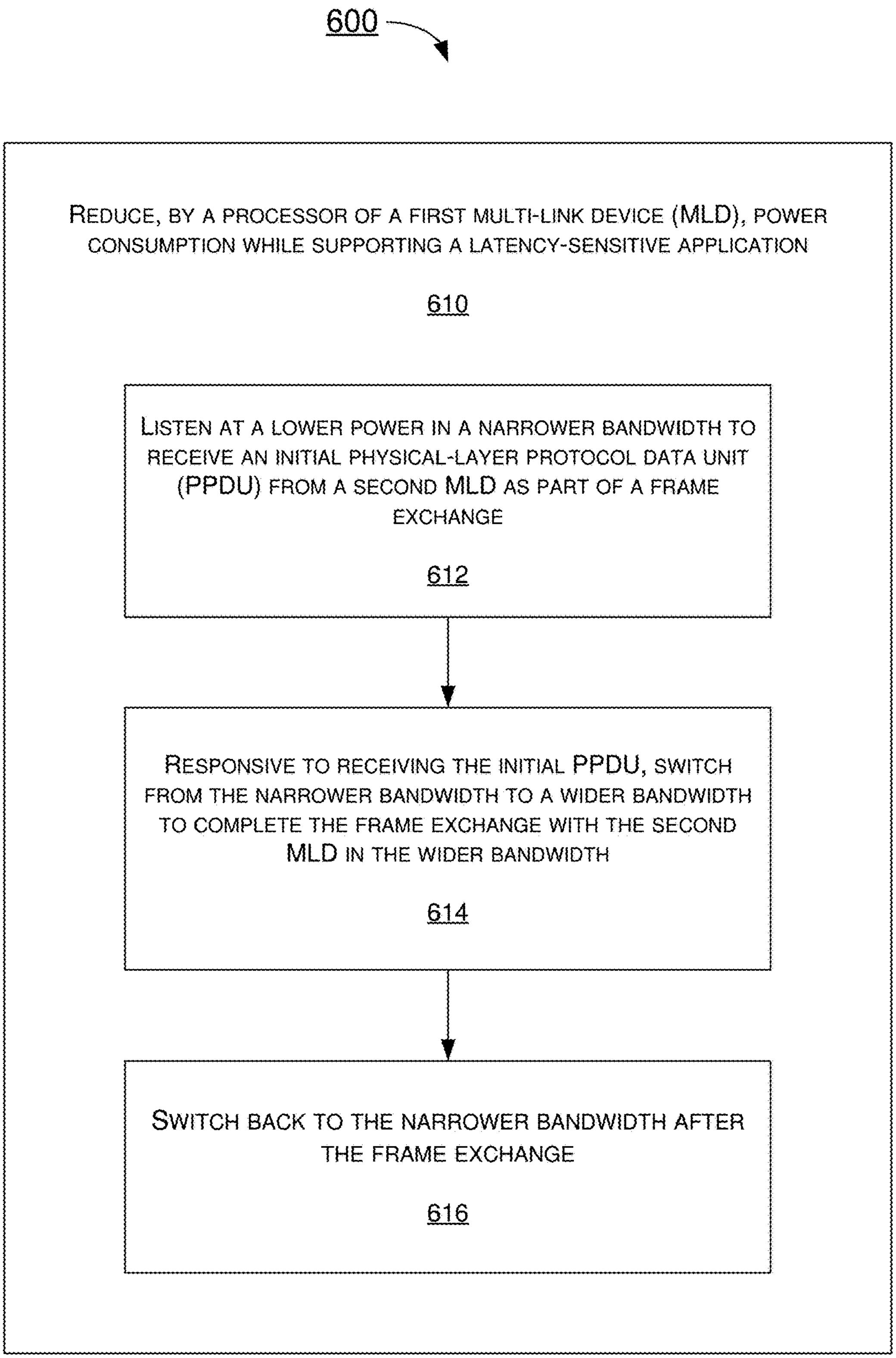
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to low-power EMLSR listen in wireless communications in accordance with the present disclosure. Process 600 may include one or more operations, actions, or functions as illustrated by one or more of blocks 610 as well as subblocks 612, 614 and 616. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as STA 110 functioning as a non-AP STA and apparatus 520 implemented in or as STA 120 functioning as an AP STA of a wireless network such as a WLAN in network environment 100 in accordance with one or more of IEEE 802.11 standards. Process 600 may begin at block 610.

At 610, process 600 may involve processor 512 of apparatus 510, as a first STA affiliated with an MLD (e.g., STA 110), reducing power consumption while supporting a latency-sensitive application by performing certain operations represented by 612, 614 and 616.

At 612, process 600 may involve processor 512 listening, via transceiver 516, at a lower power in a narrower bandwidth to receive an initial PPDU from apparatus 520, as a second MLD, as part of a frame exchange. Process 600 may proceed from 612 to 614.

At 614, process 600 may involve processor 512 switching transceiver 516 from the narrower bandwidth to a wider bandwidth to complete the frame exchange with the second MLD in the wider bandwidth in response to receiving the initial PPDU. Process 600 may proceed from 614 to 616.

At 616, process 600 may involve processor 512 switching transceiver 516 back to the narrower bandwidth after the frame exchange.

In some implementations, the narrower bandwidth may include a 20 MHz, 40 MHz, 80 MHz, or 160 MHz bandwidth, and the wider bandwidth may include a\ 40 MHz, 80 MHz, 160 MHz or 320 MHz bandwidth. In some implementations, in reducing the power consumption, process 600 may involve processor 512 reducing the power consumption by the MLD to the lower power when operating in the narrower bandwidth compared to a higher power used by the MLD when operating in the wider bandwidth.

In some implementations, in switching from the narrower bandwidth to the wider bandwidth, process 600 may involve processor 512 switching from a listening bandwidth to a received data bandwidth without switching a synthesizer central frequency.

In some implementations, in switching from the narrower bandwidth to the wider bandwidth, process 600 may involve processor 512 performing a synthesizer central frequency switching.

In some implementations, in switching from the narrower bandwidth to the wider bandwidth, process 600 may involve processor 512 performing the switching with an offset synthesizer that offsets an original central frequency used in the listening.

In some implementations, in switching, process 600 may involve processor 512 switching an operating bandwidth of transceiver 516 from the narrower bandwidth to the wider bandwidth responsive to having correctly received the initial PPDU. Alternatively, in switching, process 600 may involve processor 512 switching the operating bandwidth of transceiver 516 from the narrower bandwidth to the wider bandwidth after a bandwidth of the initial PPDU is identified.

In some implementations, in listening, process 600 may involve processor 512 listening in an EMLSR mode, an EMLMR mode, a non-EMLSR mode, an MLSR mode, an MLMR mode, a SMPS mode, a BWPS mode, a P2P mode, or a TDLS mode.

In some implementations, in listening, process 600 may involve processor 512 informing apparatus 520 that apparatus 510 is capable of low-power listening in a BWPS mode. In such cases, the initial PPDU may be received with a non-HT duplicate format with MU-RTS, RTS or BSRP in a PSDU.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of reducing power consumption while supporting a latency-sensitive application by a process of a first multi-link device (MLD), comprising:

listening, as a non-access point (non-AP) station (STA), at a lower power in a narrower bandwidth to receive an initial physical-layer protocol data unit (PPDU) from a second MLD as part of a frame exchange; and responsive to receiving the initial PPDU, switching from the narrower bandwidth to a wider bandwidth to complete the frame exchange with the second MLD in the wider bandwidth, wherein the reducing the power consumption comprises reducing the power consumption by the first MLD to the lower power when operating in the narrower bandwidth compared to a higher power used by the first MLD when operating in the wider bandwidth, wherein the listening comprises informing the second MLD that the first MLD is capable of low-power listening in a bandwidth power-save (BWPS) mode, wherein the listening further comprises listening on one or more enhanced multi-link single radio (EMLSR) links by having one or more affiliated STAs corresponding to the one or more EMLSR links in an awake state, wherein the initial PPDU is received with a non-high-throughput (non-HT) duplicate format with a buffer status report poll (BSRP) in a Physical Layer Convergence Procedure (PLCP) service data unit (PSDU), and wherein the listening is performed while the first MLD is operating as a non-AP MLD in an EMLSR mode, and comprises performing clear channel assessment and receiving an initial control frame transmitted in a non-high-throughput (non-HT) format or a non-HT duplicate PPDU format.

2. The method of claim 1, wherein the narrower bandwidth comprises a 20 MHz bandwidth, and wherein the wider bandwidth comprises a 40 MHz, 80 MHz, 160 MHz or 320 MHz bandwidth.

3. The method of claim 1, wherein the switching from the narrower bandwidth to the wider bandwidth comprises switching from a listening bandwidth to a received data bandwidth without switching a synthesizer central frequency.

4. The method of claim 1, wherein the switching from the narrower bandwidth to the wider bandwidth comprises performing a synthesizer central frequency switching.

5. The method of claim 1, wherein the switching from the narrower bandwidth to the wider bandwidth comprises performing the switching with an offset synthesizer that offsets an original central frequency used in the listening.

6. The method of claim 1, wherein the switching comprises switching an operating bandwidth of a radio frequency (RF) transceiver of the first MLD from the narrower bandwidth to the wider bandwidth responsive to having correctly received the initial PPDU.

7. The method of claim 1, wherein the switching comprises switching an operating bandwidth of a radio frequency (RF) transceiver of the first MLD from the narrower bandwidth to the wider bandwidth after a bandwidth of the initial PPDU is identified.

8. The method of claim 1, wherein the listening comprises listening in an enhanced multi-link single radio (EMLSR) mode, an enhanced multi-link multiple radios (EMLMR) mode, a non-EMLSR mode, a multi-link single radio (MLSR) mode, a multi-link multiple radios (MLMR) mode, a spatial-multiplexing power-save (SMPS) mode, a bandwidth power-save (BWPS) mode, a peer-to-peer (P2P) mode, or a tunneled direct link setup (TDLS) mode.

9. The method of claim 1, further comprising:

switching, by the processor, back to the narrower bandwidth after the frame exchange.

10. An apparatus implementable in a first multi-link device (MLD), comprising:

a transceiver configured to communicate wirelessly; and a processor coupled to the transceiver and configured to reduce power consumption while supporting a latency-sensitive application by performing operations, as a non-access point (non-AP) station (STA), comprising:

listening, via the transceiver, at a lower power in a narrower bandwidth to receive an initial physical-layer protocol data unit (PPDU) from a second MLD as part of a frame exchange; and responsive to receiving the initial PPDU, switching the transceiver from the narrower bandwidth to a wider bandwidth to complete the frame exchange with the second MLD in the wider bandwidth, wherein the reducing the power consumption comprises reducing the power consumption by the first MLD to the lower power when operating in the narrower bandwidth compared to a higher power used by the first MLD when operating in the wider bandwidth, wherein the listening comprises informing the second MLD that the first MLD is capable of low-power listening in a bandwidth power-save (BWPS) mode, wherein the listening further comprises listening on one or more enhanced multi-link single radio (EMLSR) links by having one or more affiliated STAs corresponding to the one or more EMLSR links in an awake state, wherein the initial PPDU is received with a non-high-throughput (non-HT) duplicate format with a buffer status report poll (BSRP) in a Physical Layer Convergence Procedure (PLCP) service data unit (PSDU), and wherein the listening is performed while the first MLD is operating as a non-AP MLD in an EMLSR mode, and comprises performing clear channel assessment and receiving an initial control frame transmitted in a non-high-throughput (non-HT) format or a non-HT duplicate PPDU format.

11. The apparatus of claim 10, wherein the narrower bandwidth comprises a 20 MHz bandwidth, and wherein the wider bandwidth comprises a 40 MHz, 80 MHz, 160 MHz or 320 MHz bandwidth.

12. The apparatus of claim 10, wherein the switching from the narrower bandwidth to the wider bandwidth comprises switching from a listening bandwidth to a received data bandwidth without switching a synthesizer central frequency.

13. The apparatus of claim 10, wherein the switching from the narrower bandwidth to the wider bandwidth comprises performing a synthesizer central frequency switching.

14. The apparatus of claim 10, wherein the switching from the narrower bandwidth to the wider bandwidth comprises performing the switching with an offset synthesizer that offsets an original central frequency used in the listening.

15. The apparatus of claim 10, wherein the switching comprises switching an operating bandwidth of the transceiver of the first MLD from the narrower bandwidth to the wider bandwidth responsive to having correctly received the initial PPDU.

16. The apparatus of claim 10, wherein the switching comprises switching an operating bandwidth of the transceiver of the first MLD from the narrower bandwidth to the wider bandwidth after a bandwidth of the initial PPDU is identified.

17. The apparatus of claim 10, wherein the listening comprises listening in an enhanced multi-link single radio (EMLSR) mode, an enhanced multi-link multiple radios (EMLMR) mode, a non-EMLSR mode, a multi-link single radio (MLSR) mode, a multi-link multiple radios (MLMR) mode, a spatial-multiplexing power-save (SMPS) mode, a bandwidth power-save (BWPS) mode, a peer-to-peer (P2P) mode, or a tunneled direct link setup (TDLS) mode.

18. The apparatus of claim 10, wherein the processor is configured to further perform operations comprising:

switching the transceiver back to the narrower bandwidth after the frame exchange.

19. The method of claim 1, wherein the listening is performed on the one or more EMLSR links by maintaining only the one or more affiliated STAs corresponding to the one or more EMLSR links in the awake state while other one or more affiliated stations remain in a doze state.

20. The method of claim 1, wherein the initial control frame is a first frame of the frame exchange and is transmitted using a data rate of 6 Mbps, 12 Mbps, or 24 Mbps.

* * * * *